(12) United States Patent
Sun et al.

(10) Patent No.: US 6,858,702 B2
(45) Date of Patent: Feb. 22, 2005

(54) POLYAMIDE COMPOUNDS

(75) Inventors: Yanhui Sun, Wilmington, DE (US); Jun Zhao, Newark, DE (US)

(73) Assignee: Invista North America S.á.r.l., Wilmington, DE (US)

( * ) Notice: Subject to any disclaimer, the term of this patent is extended or adjusted under 35 U.S.C. 154(b) by 0 days.

(21) Appl. No.: 10/093,654

(22) Filed: Mar. 7, 2002

(65) Prior Publication Data

US 2002/0147298 A1 Oct. 10, 2002

Related U.S. Application Data

(62) Division of application No. 09/708,209, filed on Nov. 8, 2000, now Pat. No. 6,576,340.
(60) Provisional application No. 60/165,373, filed on Nov. 12, 1999.

(51) Int. Cl.$^7$ .............................................. C08L 77/00
(52) U.S. Cl. ........................................ 528/340; 525/425
(58) Field of Search .......................... 528/340; 525/425

(56) References Cited

U.S. PATENT DOCUMENTS

| | | | |
|---|---|---|---|
| 3,305,603 A | 2/1967 | McIntyre et al. | |
| 3,397,161 A | 8/1968 | Miller | |
| 3,867,478 A | 2/1975 | Chimura et al. | |
| 3,901,853 A | 8/1975 | Tanikella | |
| 3,932,126 A | 1/1976 | Jilla | |
| 4,001,189 A | 1/1977 | Tanikella et al. | |
| 4,001,190 A | 1/1977 | Tanikella et al. | |
| 4,002,427 A | 1/1977 | Muller et al. | |
| 4,145,473 A | 3/1979 | Samuelson et al. | |
| 4,167,541 A | 9/1979 | Alexander | |
| 5,068,283 A | 11/1991 | Ohmae et al. | |
| 5,108,675 A | 4/1992 | Matsuo et al. | |
| 5,322,923 A | 6/1994 | Lahary et al. | |
| 5,352,499 A | 10/1994 | Willard | |
| 5,393,849 A | 2/1995 | Srinivasan et al. | |
| 5,662,980 A | 9/1997 | Howell et al. | |
| 5,782,935 A | 7/1998 | Hirt et al. | |
| 6,331,264 B1 | 12/2001 | Kurian et al. | |

FOREIGN PATENT DOCUMENTS

| | | |
|---|---|---|
| CA | 974340 | 9/1975 |
| CA | 1028347 | 3/1978 |
| DE | 23 41 000 | 8/1973 |
| EP | 0 423 504 | 4/1991 |
| EP | 1006220 | 6/2000 |
| EP | 1016692 | 7/2000 |
| EP | 1016741 | 7/2000 |
| EP | 1033422 | 9/2000 |
| GB | 1 373 858 | 11/1974 |
| JP | 47(1972)-32184 | 11/1972 |
| JP | 57-193534 | 11/1982 |
| JP | 93302211 | 11/1993 |
| JP | 97021060 | 1/1997 |
| JP | 99100722 | 4/1999 |
| JP | 99172525 | 6/1999 |
| JP | 99200175 | 7/1999 |
| WO | WO 00/22210 | 4/2000 |
| WO | WO 00/26301 | 5/2000 |
| WO | WO 00/29653 | 5/2000 |
| WO | WO 00/58393 | 10/2000 |

OTHER PUBLICATIONS

Hoe H. Chuah, Dyeing and Staining of Poly(Trimethylene Terephthalate) Carpets.
Dyeing Behavior of 100 Percent Poly (Trimethylene Terephthalate) (PTT) Txtiles from Corterra Polymers, 1999.
Hansjorg Ludwig Traub, Synthesis and Textile Chemical Properties of Polytrimethyleneterephthalate, 1994.
Traub, Dyeing Properties of Poly(Trimethylene Terephthalate) Fibres, Mellianc, Reprint, Sep. 1995.
Dr. S. Y. Ramat & E. W. Menezes, "Processing of Polyester Fabrics", Colourage, Aug. 1–15, 1989.
Dupont Technical Information Bulletin D–303, Feb. 1978.
Dupont Technical Bulletin D–307, Nov. 1979.

*Primary Examiner*—Ana Woodward

(57) ABSTRACT

An acid-dyeable polyester composition comprising (a) polyester and (b) secondary amine or secondary amine salt in an amount effective to promote acid-dyeability. The acid-dyeable polyester composition may be prepared by melt blending: the polyester; and polymeric additive prepared from (i) triamine containing secondary amine or secondary amine salt unit(s) and (ii) one or more other monomer and/or polymer units. One polymeric additive comprises polyamide selected from the group consisting of poly-imino-bisalkylene-terephthalamide, -isophthalamide and -1,6-naphthalamide, and salts thereof. Also, the polymeric additive, the blends, shaped articles (e.g., fibers and films), processes of dyeing, and processes for preparing an acid dyeable polyester composition.

27 Claims, No Drawings

POLYAMIDE COMPOUNDS

PRIORITY

This application claims priority from U.S. provisional patent application Ser. No. 60/165,373, filed Nov. 12, 1999, and is a divisional of U.S. patent application Ser. No. 09/708,209, filed Nov. 8, 2000, now U.S. Pat. No. 6,576,340 both of which are incorporated herein by reference.

FIELD OF THE INVENTION

This invention relates to acid-dyeable polyester compositions suitable for use in manufacturing fibers, fabrics, films and other useful articles, the articles, and methods of making such compositions and articles. The acid-dyeable polyester compositions contain a polymeric additive composition that has secondary nitrogen groups. The secondary nitrogen groups provide improved acid dyeability. This invention also relates to the polymeric additive composition.

BACKGROUND OF THE INVENTION

Polyesters, especially polyalkylene terephthalates, have excellent physical and chemical properties and have been widely used for resins, films and fibers. In particular, polyester fibers have a high melting point, and can attain high orientation and crystallinity. Accordingly, polyesters have excellent fiber properties such as chemical, heat and light stability, and high strength. However, polyesters, especially polyester fibers and fabrics, are difficult to dye. The molecular structure and the high levels of orientation and crystallinity that impart the desirable properties to the polyester also contribute to a resistance to coloration by dye compounds. Also contributing to the difficulty in dyeing polyester compositions is the characteristic that polyesters do not have dye sites within the polymer chain that are reactive to basic or acid dye compounds.

Blending of nylon 6 or nylon 6,6 with polyester has been proposed to obtain the benefits of the polyamide acid dye sites in the resulting composition. The high concentrations of polyamide that may be required to impart dyeability in the resulting polyester/polyamide copolymer composition result in decreased physical properties in the polyester/polyamide copolymer and difficulties in processing. For example, Canadian Patent No. 974340 discloses an acid-dyeable polyester composition using polyamides having cyclic, tertiary nitrogen-groups incorporated into polyalkylene terephthalates by blending and extruding the two polymers, and reports that polyamide microfibrils form within the polyester matrix during filament extrusion operations when high polyamide concentrations are used.

Commonly assigned U.S. Pat. Nos. 3,901,853, 4,001,189 and 4,001,190 disclose that many methods have been proposed for improving the acid-dyeability of polyester fibers and filaments by co-polymerization of nitrogen containing modifiers into the chains of polyester molecules, but that they have been inadequate for various reasons. U.S. Pat. Nos. 3,901,853, 4,001,189 and 4,001,190 further disclose that in order to provide good acid-dyeability, the modifier should contain a highly basic nitrogen atom that functions as a dye site but does not adversely affect molecular weight or cause discoloration. Thermal stability, effectiveness at low concentrations and low volatility are important properties of the cyclic, tertiary 2,2,6,6 tetramethylpiperidine groups that are disclosed as nitrogen containing modifiers.

U.S. Pat. No. 3,867,478 discloses that the use of polyamides containing tertiary amino groups in polyesters results in brown, discolored fibers after melt-blending and melt-spinning. The brightness of the dyed fibers is also reported as reduced. U.S. Pat. No. 3,867,478 discloses the use of phosphorus compounds to improve the dyeability of polyesters containing tertiary amino groups.

Japanese Kokai No. 47-32184 discloses that nitrogen containing polyesters are difficult to acid-dye because the addition of sufficient nitrogen dye sites into the polymer causes coloring in the polymer and decreases physical properties. Lower amounts of basic nitrogen in polyesters are said to be insufficient to develop adsorption toward the acidic dye. The addition of benzene derivatives to the dye bath is proposed to improve the dyeability of the fibers.

Although, as described above, substantial work has been done with respect to the use of tertiary amine compounds to enhance the dyeability of polyesters, secondary aliphatic amines have generally been used in polymeric compositions as chain branching agents or crosslinkers because of their functionality. U.S. Pat. No. 4,145,473 to Samuelson, et al. discloses the use of bis-(hexamethylene)triamine as a branching agent to increase the viscosity of polymer compositions used in melt spinning fibers.

U.S. Pat. No. 5,068,283 discloses a method for producing a thermoplastic resin wherein a saturated polyester resin and an epoxy group-containing ethylene copolymer are melt-kneaded into a composition and then further melt kneaded with a polyfunctional compound which carries out a partial cross-linking reaction. The polyfunctional compounds may be an amine. However, as disclosed in U.S. Pat. No. 5,322,923, the presence of structural derivatives of bis-(hexamethylene)triamine in amounts greater than 0.5 weight % has been shown to cause an undesirable increase in the viscosity characteristics of copolyamides used as molding compositions.

Methods that relate to treating a polyester with a dye composition containing nitrogen compounds, as opposed to including a nitrogen containing additive in the polyester, have also been proposed. U.S. Pat. No. 3,932,126 discloses a process for acid dyeing shaped or preformed polyester materials by applying an aqueous solution or printing paste of one or more acid dyes, various organic nitrogen compounds and organic carboxylic acids. The impregnated polyester material is dried and then heated. The preferred organic nitrogen compounds include alkyleneamines, alkanolamines and alkylamines.

All of the aforementioned documents are incorporated herein by reference.

It is desirable to have acid-dyeable nitrogen-containing polyester compositions which may be easily processed into fibers, films or other shaped articles and acid-dyed without expensive additives, special solutions, and/or complicated application procedures.

SUMMARY OF THE INVENTION

This invention is directed to an acid-dyeable polyester composition comprising (a) polyester and (b) secondary amine or secondary amine salt in an amount effective to promote acid-dyeability.

Preferably the acid-dyeable polyester composition is prepared by melt blending (a) polyester; and (b) polymeric additive prepared from (i) triamine containing secondary amine or secondary amine salt unit(s) and (ii) one or more other monomer and/or polymer units.

In another preferred embodiment, the acid-dyeable polyester composition of claim 1 prepared by melt blending (a) a polyester; and (b) a polyamide or polyamide salt selected from the group consisting of poly-imino-bisalkylene-terephthalamide, -isophthalamide and -1,6-naphthalamide and salts thereof.

By "polyester" or "a polyester" applicant is referring to single polyester, or blends or mixtures of polyesters. This comment also applies to "polymeric additive", "polyamide", "polyamide salt", and other such terms that are used herein. Thus, for instance, if applicant refers to a composition containing X mole % of a polyester, the composition may comprise X mole % of one polyester or X mole % total of different polyesters.

The polyester is selected from the group consisting of polyalkylene terephthalate, polyalkylene naphthalate and polyalkylene isophthalate.

Preferably the acid-dyeable polyester composition comprises at least about 0.5 mole %, more preferably at least about 1 mole %, most preferably at least about 2 mole %, of secondary amine units. Preferably the acid-dyeable polyester composition comprises less than about 15 mole %, more preferably less than about 10 mole %, and most preferably less than about 5 mole % of secondary amine units. This mole percentage is calculated based upon the number of repeat units in the polyester composition, including the polyester and polymeric additive.

Preferably the polyester is selected from the group consisting of polyethylene terephthalate, polytrimethylene terephthalate and polytetramethylene terephthalate, more preferably polytrimethylene terephthalate.

The polyamide comprises a compound having the following formula:

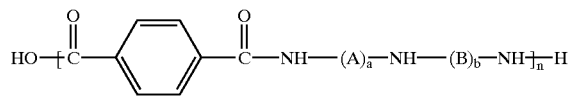

Preferably A or B, which may be the same or different, are selected from aliphatic or aromatic substituents.

Preferably n is at least 3, more preferably at least 10. Preferably n is 30 or less, more preferably 20 or less. Most preferably n is 15.

Preferably a is at least 1, more preferably at least 3, most preferably at least 5. Preferably a is 20 or less, more preferably 12 or less.

Preferably b is at least 1, more preferably at least 3, most preferably at least 5. Preferably b is 20 or less, more preferably 12 or less.

Most preferably, A or B, which may be the same or different, are selected from alkyl and aryl and each may contain 0–20 alkyl units and 0–3 aryl units, provided that each contains at least one aryl unit or at least two alkyl units. The alkyl and aryl units may be substituted or unsubstituted, straight or branched, etc., as long as the substituent(s) and branches don't substantially interfere with dyeing or other fiber properties (e.g., the chain may contain an ether group).

Preferably the polyamide is poly(6,6'-imino-bishexamethylene terephthalamide) having repeat units according to the formula:

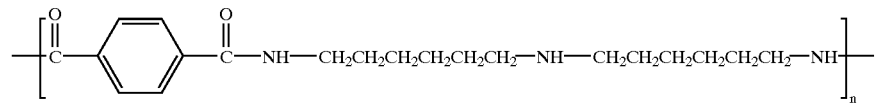

wherein n is preferably at least 3, and n is preferably 30 or less.

The polyester composition may be in the form of a fiber, such as a monocomponent or bicomponent fiber, or a yarn made therefrom. The polyester composition may alternatively be in the form of a film or film layer.

In one preferred embodiment, the polyester composition comprises a block copolymer of the polyester and the polymeric additive. By block copolymer, for example with reference to the poly(6,6'-imino-bishexamethylene terephthalamide) polymeric additive and polytrimethylene terephthalate, applicants are referring to a polymer formed by the polyester joined to the polymeric additive by a covalent bond.

The invention is further directed to an acid-dyed polyester composition prepared by acid dyeing the composition described above, and a process comprising (1) providing the polyester composition and (2) acid dyeing the composition. When the polymeric composition comprises a triamine containing secondary amine unit(s), the primary dye site is the imine thereof.

The invention is also directed to a blend comprising (a) polyester; and (b) polymeric additive prepared from (i) triamine containing secondary amine unit(s) or secondary amine salt unit(s) and (ii) one or more other monomer and/or polymer units or a salt thereof. Alternatively, it is also directed to a blend comprising (a) polyester; and (b) polyamide or polyamide salt selected from the group consisting of poly-imino-bisalkylene-terephthalamide, -isophthalamide and -1,6-naphthalamide and salts thereof.

In addition, the invention is directed to a compound having the following formula:

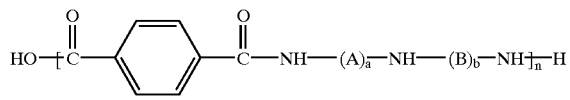

A or B, which may be the same or different, n, a and b are preferably as described herein.

The invention is also directed to a process for preparing an acid dyeable polyester composition comprising the steps of (1) combining about 0.5 mole %–about 15 mole %, or the preferred amounts specified herein, of secondary amine units with a polyalkylene terephthalate, polyalkylene naphthalate or polyalkylene isophthalate in a polymeric additive wherein the amount of secondary amine units is effective to promote acid-dyeability, (2) mixing and heating the polymeric additive and said polyalkylene terephthalate at a temperature sufficient to form a blend, and (3) forming the blend into a shaped article.

In one embodiment, the invention provides an acid-dyeable polyester composition comprising at least about 50 and up to about 99.5 mole % of a polyalkylene terephthalate, and from about 0.5 mole %–about 15 mole % of secondary amine units in a polymeric additive. (Mole percentages are based on the repeat units in the polyester composition.) This amount of secondary amine units is effective to promote acid-dyeability. Where the secondary amine units form part of a polymeric additive, the comonomer will also be present in about 0.5 mole %–about 15 mole %. The amount of secondary amine units effective to promote acid-dyeability is preferably at least about 0.5 mole %, more preferably at least about 1 mole %, most preferably at least about 2 mole %, based on the polyester composition. The amount of secondary amine units effective to promote acid-dyeability is preferably about 15 mole % or less, more preferably about 5 mole % or less, based on the polyester composition.

In preferred embodiments of the invention, the polymeric additive may comprise secondary amine units combined in substantially 1:1 molar ratio with other monomer units, for example terephthalate or naphthalene dicarboxylate units, in order to construct the polymeric additive in such a way that it may be easily combined with polyesters such as polyalkylene terephthalate.

The secondary amine unit may preferably be obtained from a compound selected from the group represented by $H_2N(CH_2)_mNH(CH_2)_nNH_2$ and its salts with a phosphorus-containing acid. Therein, m and n, which may be the same or different, are integers, preferably at least two, more preferably at least 4, preferably ten or less and preferably eight or less. The secondary amine unit may be an unsalinized amine, or may be partly or completely salinized with a phosphorus-containing acid such as phosphorous acid, phosphoric acid or pyrophosphoric acid. Preferably the amine is bis(hexamethylene)triamine (m=n=6), and preferably it is combined with a terephthalate or naphthalene dicarboxylate unit. Preferably the polyalkylene terephthalate polyester is polytrimethylene terephthalate. In embodiments of the invention, the acid-dyeable polyester composition of the invention is a block copolymer of polyalkylene terephthalate and a polymeric additive comprising secondary amine units and terephthalamide or naphthylene dicarboxylamide units in substantially 1:1 molar ratio.

The invention provides an acid-dyeable polyester composition that may be shaped into fibers, films, membranes and other useful shapes and is easily acid dyed to a dye exhaustion of about 30%–about 80% or higher, preferably about 60%–about 80% or higher.

The invention also provides a process for preparing an acid-dyeable polyester composition comprising the steps of: (1) combining secondary amine units with polyalkylene terephthalate in polymeric additive wherein the amount of secondary amine units is effective to promote acid-dyeability; (2) mixing and heating the polymeric additive and the polyalkylene terephthalate at a temperature sufficient to form a blend, and (3) forming the blend into a shaped article.

The term "blend" as used herein to describe a composition is taken to mean a composition comprising a copolymer of the polyalkylene terephthalate and the polymeric additive, which may also include unreacted polyalkylene terephthalate and/or unreacted polymeric additive. The blend may comprise at least about 70%, more preferably at least about 80%, and most preferably at least about 90%, of a copolymer of the polyalkylene terephthalate and the polymeric additive. Most preferably, the blend comprises at least 90% of a block copolymer of the polyalkylene terephthalate and the polymeric additive. The shaped articles may be stretched and heat treated to develop physical properties either before or after treatment with acid dyes.

DETAILED DESCRIPTION OF THE INVENTION

By "acid-dyeable" it is meant that the composition itself, or fiber, fabric, film or any other article (e.g., shaped articles) made with the composition has an affinity for acid dyes.

The polyester is preferably polyalkylene terephthalate, polyalkylene naphthalate and polyalkylene isophthalate, and polyalkylene terephthalate is most preferred. The preferred polyalkylene terephthalates are fiber-forming linear condensation polymers having carboxyl linking radicals in the polymer chain. Polyethylene terephthalate ("2GT"), polytrimethylene terephthalate ("3GT" or "PTT"), and polytetramethylene terephthalate ("4GT") are preferred. Polytrimethylene terephthalate is especially preferred.

In the absence of an indication to the contrary, a reference to "polyalkylene terephthalate" is meant to encompass copolyesters, i.e., polyesters made using 3 or more reactants, each having two ester forming groups. For example, a copoly(ethylene terephthalate) can be used in which the comonomer used to make the copolyester is selected from the group consisting of linear, cyclic, and branched aliphatic dicarboxylic acids having 4–12 carbon atoms (for example butanedioic acid, pentanedioic acid, hexanedioic acid, dodecanedioic acid, and 1,4-cyclo-hexanedicarboxylic acid); aromatic dicarboxylic acids other than terephthalic acid and having 8–12 carbon atoms (for example isophthalic acid and 2,6-naphthalenedicarboxylic acid); linear, cyclic, and branched aliphatic diols having 3–8 carbon atoms (for example 1,3-propanediol, 1,2-propanediol, 1,4-butanediol, 3-methyl-1,5-pentanediol, 2,2-dimethyl-1,3-propanediol, 2-methyl-1,3-propanediol, and 1,4-cyclohexanediol); and aliphatic and aromatic ether glycols having 4–10 carbon atoms (for example, hydroquinone bis(2-hydroxyethyl) ether, or a poly(ethylene ether) glycol having a molecular weight below about 460, including diethyleneether glycol). The comonomer typically can be present in the copolyester at a level in the range of about 0.5–about 15 mole %. Isophthalic acid, pentanedioic acid, hexanedioic acid, 1,3-propane diol, and 1,4-butanediol are preferred because they are readily commercially available and inexpensive.

Copoly(trimethylene terephthalate) made from 1,3-propanediol can also be used, in which case the comonomer(s) can be selected from the above list (except the aliphatic diols having 2–8 carbon atoms may be used and ethanediol should replace 1,3-propanediol in the list).

The copolyester(s) can contain minor amounts of other comonomers, and such comonomers are usually selected so that they do not have an significant adverse affect on the amount of fiber crimp (in the case of a spontaneously crimpable polyester bicomponent fibers) or on other properties. Such other comonomers include 5-sodium-sulfoisophthalate, for example, at a level in the range of about 0.2–5 mole %. Very small amounts of trifunctional comonomers, for example trimellitic acid, can be incorporated for viscosity control.

The polyester composition contains an effective amount of a secondary amine unit to promote acid-dyeability. In the most preferred embodiment, the composition is prepared by melt blending polyester and polymeric additive comprising secondary amine. The most preferred polymeric additive for a polytrimethylene terephthalate (or polytrimethylene terephthalate copolymer) is prepared from (i) triamine containing a secondary amine unit and (ii) one or more other monomer and/or polymer units.

In a second embodiment, the secondary amine may be added to the polyester, so that it is a comonomer(s). Polyester(s) containing such comonomers and polyester(s) without such a comonomer can be blended or melt blended.

In a third embodiment, secondary amine may be mixed with polyester.

The particular amount of secondary amine unit used in the polyester compositions may depend on which secondary amine unit containing compound is used, which acid dye or dyes are used, and also the particular composition of the acid-dyeable polyester of the invention.

Preferably, the secondary amine unit is present in the polymer composition in an amount of at least about 0.5 mole %, more preferably at least 1 mole %. The secondary amine unit is present in the polymer composition in an amount preferably of about 15 mole % or less, more preferably about 10 mole % or less, and most preferably 5 mole % or less, based on the repeat units in the polyester composition.

The polymeric additive composition is preferably formed from (i) triamine containing secondary amine unit and (ii) one or more other monomer and/or polymer units. The molar ratio of (i) the triamine containing a secondary amine unit, and (ii) the one or more other monomer and/or polymer units is approximately 1:1. It is preferable to add a slight excess on the order of 1 mole %–10 mole % of the triamine (i) to promote end capping of the polymeric additive composition with primary amine unit during synthesis. In this embodiment of the invention, the amine groups on the end of the polymeric additive molecule are available to form amide linkages with the polyester component of the composition. An excess of (ii), the one or more other monomer and/or polymer units, may also be used.

In embodiments of the polyester composition wherein the molar ratio of the (i) triamine containing a secondary amine unit and the (ii) one or more other monomer and/or polymer units is approximately 1:1 in the polymeric additive composition, the resultant molar concentration of the (i)–(ii) repeat units in the acid dyeable polyester compositions of the invention is about 0.5 mole %–about 15 mole %, based on the polyester composition.

Preferably, the triamine (i) containing a secondary amine unit is combined with (ii) terephthalate or naphthalene dicarboxylate monomer unit to form a polyamide having an imine group.

Preferably the acid-dyeable polyester composition is prepared by melt blending (a) polyester; and (b) polymeric additive prepared from (i) triamine containing secondary amine or secondary amine salt unit(s) and (ii) one or more other monomer and/or polymer units.

In another preferred embodiment, the acid-dyeable polyester composition of claim 1 prepared by melt blending (a) a polyester; and (b) a polyamide or polyamide salt selected from the group consisting of poly-imino-bisalkylene-terephthalamide, -isophthalamide and -1,6-naphthalamide and salts thereof.

Preferably the polyamide comprises a compound having the following formula:

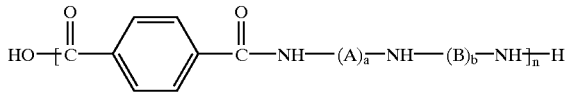

Preferably A or B, which may be the same or different, are selected from aliphatic or aromatic substituents. Preferably n is at least 3, more preferably at least 10. Preferably n is 30 or less, more preferably 20 or less. Most preferably n is 15. Preferably a is at least 1, more preferably at least 3, most preferably at least 5. Preferably a is 20 or less, more preferably 12 or less. Preferably b is at least 1, more preferably at least 3, more preferably at least 5. Preferably b is 20 or less, more preferably 12 or less.

Preferably a is at least 1, more preferably at least 3, most preferably at least 5. Preferably a is 20 or less, more preferably 12 or less. Preferably b is preferably at least 3, most preferably at least 5. Preferably b is 20 or less, more preferably 12 or less.

Preferably, A or B, which may be the same or different, are selected from alkyl and aryl and each may contain 0–20 alkyl units and 0–3 aryl units, provided that each contains at least one aryl unit or at least two alkyl units. The alkyl and aryl units may be substituted or unsubstituted, straight or branched, etc., as long as the substituent(s) and branches don't substantially interfere with dyeing or other fiber properties (e.g., the chain may contain an ether group).

In the most preferred embodiment, dimethyl terephthalate is combined with bis(hexamethylene) triamine to form a poly(6,6'-imino-bishexamethylene terephthalamide) having repeat units according to the formula:

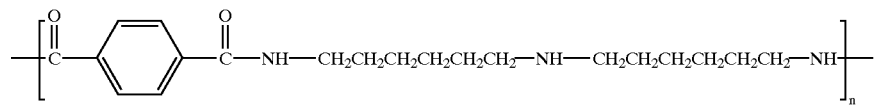

Therein, n is preferably at least 3 and preferably 30 or less. Any suitable polymeric synthesis route may be used to form a poly(6,6'-imino-bishexamethylene terephthalamide) polymeric additive composition in accordance with the present invention. Suitable alternative to dimethyl terephthalate (DMT) include the aliphatic and aromatic dicarboxylic acids or esters mentioned above as comonomers in making polyesters, such as terephthalic acid (TPA). Two or more such monomers can be used in forming the polymeric additive.

The secondary amine unit may be incorporated into the polymer chain of the polyester composition by melt blending the polymeric additive and other monomer units; for example, by melt blending terephthalate or naphthalene dicarboxylate—second amine polymeric additive and polyester (e.g., polyalkylene terephthalate). Melt blending is preferably carried out at about 230–about 270° C., most preferably about 260° C.

Diamines or other chain extenders can be added to the polymeric additive to enhance its melt properties (e.g., higher melting temperature or viscosity). The final copolymer (i.e., when reacted with dimethyl terephthalate (DMT) or another such compound) has improved intrinsic viscosity and/or tenacity. Any chain extender that extends the chain, preferably without substantially impacting dyeability or the other properties of the polymer composition, can be used. Preferred are diamines having the formula $H_2N—(CH_2)_n—NH_2$ wherein n is preferably 2 or more, preferably 12 or less, more preferably 2–6, and most preferably 6. Aromatic diamines having the same basic formula may also be useful for this purpose. The ratio of triamine to diamine is broad, with a preferred mole ratio of triamine:diamine of at least about 7:3, more preferably at least about 4:1 and most preferably at least about 9:1. The diamines will fill the place of the triamines in the polymer chain of the polymeric additive, so in the case of a copolymer of diacid, diamine and triamine the ratio of diacid:(diamine and triamine) should be about 1:1.

In a preferred embodiment, hexamethylene diamine (HMD) and bis(hexamethylene) triamine (BHMT) are used to form poly(6,6'-imino-bishexamethylene terephthalamide-co-hexamethylene terephthalamide) (PBHMT/PHMT). The product of DMT, BHMT and HMD is a grasslike polymer, which can be broken up and ground prior to use.

The polymeric additive (e.g., poly(6.6'imino-bis (hexamethylene terephthalimide)) or poly(6,6'-imino-bishexamethylene terephthalamide-co-hexamethylene terephthalamide)) can be salinized with any acid that stabilizes the amine or protects the amine group until dyeing is carried out. The acid is preferably added to the reaction mixture used to form the polymeric additive. Preferred are inorganic acids such as a phosphorus-containing acid. More preferably it is salinized with phosphorous acid or phosphoric acid, most preferably phosphorous acid. The salinized additive has several benefits over the unsalinized additive. It improves fiber color, i.e., the degree of whiteness versus yellowness. It can reduce the IV loss during spinning, thus improving the fiber's physical properties. During dyeing operations, it improves the degree of dye exhaust onto the fibers, increasing the deepness of color. The preferred poly (6.6'imino-bis(hexamethylene terephthalimide) phosphorous acid salt is depicted below.

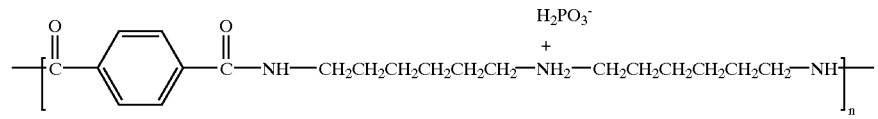

The Mn for the polyester (e.g., polyalkylene terephthalate) is preferably at least about 10,000, more preferably at least about 20,000, and is preferably about 40,000 or less, more preferably about 25,000 or less. The preferred Mn depends on the polyester used.

The number average molecular weight (Mn) of the polymeric additive is preferably at least about 1,000, more preferably at least about 3,000, and most preferably at least about 4,000, and preferably about 10,000 or less, more preferably about 7,000 or less, and most preferably about 5,000 or less.

The Mn for the acid-dyeable polyester composition is preferably at least about 5,000, more preferably at least about 10,000, and preferably about 30,000 or less, more preferably about 20,000 or less.

When the polyester composition is melt spun into fibers or filaments, long chain length linear polymer molecules are desirable.

The polymeric additive composition including the secondary amine unit should be thermally stable.

Polyesters can be manufactured by the processes described in U.S. Pat. Nos. 5,015,789, 5,276,201, 5,284,979, 5,334,778, 5,364,984, 5,364,987, 5,391,263, 5,434,239, 5,510454, 5,504,122, 5,532,333, 5,532,404, 5,540,868, 5,633,018, 5,633,362, 5,677,415, 5,686,276, 5,710,315, 5,714,262, 5,730,913, 5,763,104, 5,774,074, 5,786,443, 5,811,496, 5,821,092, 5,830,982, 5,840,957, 5,856,423, 5,962,745 and 5,990265, EP 998 440, WO 00/14041 and 98/57913, H. L. Traub, "Synthese und textilchemische Eigenschaften des Poly-Trimethyleneterephthalats", Dissertation Universitat Stuttgart (1994), S. Schauhoff, "New Developments in the Production of Polytrimethylene Terephthalate (PTT)", Man-Made Fiber Year Book (September 1996), and U.S. patent application Ser. Nos. 09/016,444, 09/273,288, 09/291,960, 09/346,148, 09/382, 970, 09/382,998, 09/500,340, 09/501,700, 09/502,322, 09/502,642, 09/503,599, and 09/505,785, all of which are incorporated herein by reference. Poly(trimethylene terephthalate)s useful as the polyester of this invention are commercially available from E. I. du Pont de Nemours and Company, Wilmington, Del. under the trademark Sorona and from Shell Chemical Company, Houston, Tex. under the trademark Corterra.

Polymeric additive can be made from DMT according to the following procedure. DMT and BHMT are reacted at elevated temperature (up to about 230° C.), preferably in the presence of water. The methanol by-product is distilled off. Then, the reaction is continued under vacuum at about 0.2–about 1 mm Hg, preferably for about 30 minutes–about 1 hour, followed by cooling.

With TPA, a TPA salt with BHMT is formed in an aqueous solution, this solution is then charged into an autoclave and heated up to about 200° C. at about 220 psig. Then, the pressure is released while maintaining the temperature. This is followed by cooling.

Salinization is preferably carried out by mixing the polymeric additive starting materials with the salinizing agent.

The preferred process for preparing the acid-dyeable polyester composition according to the invention comprises the steps of combining the polymeric additive with the polyester. The polymeric additive has an amount of a secondary amine unit effective to promote acid-dyeability. The polymeric additive and the polyester are mixed and heated at a temperature sufficient to form a blend, and the blend is formed into a shaped article. The mixing, heating and forming may be carried out by conventional equipment designed for that purpose such as extruders, banbury mixers or the like. The temperature should be above the melting points of each component but below the lowest decomposition temperature, and accordingly must be adjusted for any particular composition of polyester and polymeric additive. The polyester and polymeric additive may be heated and mixed simultaneously, pre-mixed in a separate apparatus before the heating occurs, or alternately may be heated and then mixed.

The preparation of the polymeric additive and the acid-dyeable polyester (as well as the melt spinning of the acid-dyeable polyester) may be carried out at elevated temperatures in the range of about 200° C.–about 270° C., most preferably about 250–260° C., depending on the particular polyalkylene terephthalate employed in the acid dyeable polyester composition of the invention. The polymeric additive composition must also be compatible with the polyalkylene terephthalate composition in order to be mixed and heated to form a blend.

When linear polymer forming conditions are employed and the polyester (e.g., polyalkylene terephthalate) and the polymeric additive are mixed and heated to form a composition, the primary amine functional group at the end of the triamine molecule portion of the polymeric additive reacts to form an amide linkage with carboxyl groups of the polyester, leaving the secondary amine unit portion of the triamine essentially unreacted and free to form a dye site. Thus the secondary amine units become a part of the polymer chain and their presence in the polyester fiber formed from the acid-dyeable compositions of the invention is permanent and they are not easily removed by washing, dry cleaning or other processes used to launder fabric articles.

The acid-dyeable polyester composition of the invention typically does not discolor and/or thermally degrade. This is especially advantageous when the polyester composition is thermally processed, for example by extrusion from the melt, into shapes such as films, fibers or membranes. The dyed articles are superior in color fastness, brightness, weather resistance, wear resistance and oxidation stability.

The polyester composition of the invention may be used to produce, acid-dyeable shaped articles, including high strength shaped articles. For example, in particular embodiments of the invention wherein the polyester is polytrimethylene terephthalate, melt-spun filaments having a tenacity of 2.0 g/d or more and a dye exhaustion of 30%–80%, preferably 60%–80% or higher, are obtained. This is quite remarkable because polytrimethylene terephthalate is generally considered a difficult polyester to spin into high strength fibers or filaments. This difficulty may be attributable to its property of being a more amorphous polymer than other polyalkylene terephthalates and therefore more difficult to develop crystallinity and high strength by post melt-spinning procedures. An added difficulty is that the use of additives to enhance one property of a polymer, e.g., acid-dyeability, often negatively affects other properties such as processability and strength. However, in accordance with the invention, acid-dyeable, high strength polyalkylene terephthalates, for example poly(trimethylene) terephthalate, fibers are obtained.

Other polymeric additives may be added to the acid-dyeable polyester composition to improve strength or facilitate post extrusion processing. For example, hexamethylene diamine may be added in minor amounts of about 0.5 mole %–about 5 mole % to add strength and processability to the acid dyeable polyester compositions of the invention. Polyamides such as Nylon 6 or Nylon 6-6 may be added in minor amounts of about 0.5 mole %–about 5 mole % to add strength and processability to the acid-dyeable polyester compositions of the invention.

The polyalkylene terephthalates may, if desired, contain additives, e.g., delustrants, viscosity boosters, optical brighteners, toning pigments, and antioxidants. Representative examples of linear, fiber-forming condensation polymers as embodied herein are set out in U.S. Pat. No. 4,001,190 to Tanikella et al. $TiO_2$ may be added to the polyester or fibers. (See, e.g., U.S. Pat. Nos. 3,671,379, 5,798,433 and 5,340,909, EP 699 700 and 847 960, and WO 00/26301, which are incorporated herein by reference.)

The compositions of this invention are useful in fibers, fabrics, films and other useful articles, and methods of making such compositions and articles. By "fibers", reference is made to items recognized in the art as fibers, such as continuous filaments, staple, and other chopped fibers. The fibers may be monocomponent (sometimes also referred to as "homofibers"), or bicomponent or other multicomponent fibers, including sheath-core, eccentric sheath-core, and side-by-side fibers. Fabrics include knitted, woven and nonwoven fabrics. The polyester compositions may form a film or a film layer, etc.

Bulked continuous filaments and fabrics may be manufactured according to the process described in U.S. Pat. Nos. 5,645,782 and 5,662,980, which are incorporated herein by reference. Other documents describing fibers and fabrics, and their manufacture, include U.S. Pat. Nos. 5,885,909 and 5,782,935, WO 99/06399, 99/27168, 99/39041, 00/22210, 00/26301, 00/29653, 00/29654, 00/39374 and 00/47507, EP 745 711, 1 016 741, 1 016 692, 1 006 220 and 1 033 422, British Patent Specification No. 1 254 826, JP 11-100721, 11-107036, 11-107038, 11-107081, 11-189920, and 11-189938, U.S. patent application Ser. Nos. 09/518,732 and 09/518,759, and H. L. Traub, "Synthese und textilchemische Eigenschaften des Poly-Trimethyleneterephthalats", Dissertation Universitat Stuttgart (1994), H. L. Traub "Dyeing properties of Poly(trimethylene terephthalate) fibres", Melliand (1995), H. L. Traub et al., "Mechanical Properties of fibers made of polytrimethylene terephthalate", Chemical Fibers International (CFI) Vol. 45, 110–111 (1995), W. Oppermann et al. "Fibers Made of Poly(trimethylene terephthalate)", Dornbirn (1995), H. S. Brown, H. H. Chuah, "Texturing of Textile Filament Yarns Based on Poly (trimethylene terephthalate)", Chemical Fibers International, 47:1, 1997. pp. 72–74, S. Schauhoff, "New Developments in the Production of Polytrimethylene Terephthalate (PTT)", Man-Made Fiber Year Book (September 1996), all of which are incorporated herein by reference.

The acid-dyeable polyester compositions can be used to make acid-dyeable polyester bicomponent fibers, for example, bicomponent fibers comprising poly(ethylene terephthalate) and poly(trimethylene terephthalate) or poly (ethylene terephthalate) and poly(tetramethylene terephthalate). Bicomponent fibers based on poly(ethylene terephthalate) and poly(trimethylene terephthalate) are preferred. The polymeric additive can be incorporated into either or both components. The components can be arranged in a sheath-core, eccentric sheath-core, or side-by-side relationship. When it is desired that the bicomponent fiber be crimpable on drawing, heat-treating, and relaxing to form a stretchable fiber, an eccentric sheath-core or side-by-side relationship can be used; side-by-side is preferred for higher crimp levels. The preferred 2GT/3GT bicomponent fibers can be manufactured as described in copending U.S patent application Ser. No. 09/488,650 and U.S. patent application Ser. No. (09/708,314, filed on even date herewith), which are incorporated herein by reference. One or both of the polyesters used in these bicomponent fibers can be copolyesters. Comonomers useful in such copolyesters are described above with respect to the discussion copoly(ethylene terephthalate) can be used to form copoly(ethylene terephthalates) and copoly(trimethylene terephthalate). The comonomer can be present in the copolyester at a level in the range of about 0.5 to 15 mole percent.

Acid dyeing is carried out using conventional techniques, such as those used for nylon.

The acid-dyeable polyester compositions according to the present invention contain secondary amines and are basic compounds. As such, they have a relatively high affinity for acid dyes and can be dyed in a range of colors. For example, the acid dyeable polyester compositions may be spun into fibers and dyed with C.I. Acid Blue 25 (C.I. 62055), C.I. Acid Red 4 (C.I. 14710), C.I. Acid Yellow 40 (C.I. 18950), C.I. Acid Green 25 (C.I. 61570), Tectilon Yellow 2G, Tectilon Red 2B, Tectilon Blue 4R, Lanaset Yellow 2R, Lanaset Red 2B, Lanaset Blue 2R and Irgalan premetallized acid dyes either alone or in combination. (These dyes are available from Ciba Specialty Chemicals Corporation, High Point, NC (Ciba).) Acid dye conditions according to the invention are preferably from a pH of 3.5 or more, and a pH of 4.5 or more is especially preferred ranging up to a pH of about 6.5. Of course, lower pH values, e.g., 3.0, may be used if desired.

EXAMPLES

The following examples are presented for the purpose of illustrating the invention, and are not intended to be limiting. All parts, percentages, etc., are by weight unless otherwise indicated.

Intrinsic Viscosity

The intrinsic viscosity (IV) was determined using viscosity measured with a Viscotek Forced Flow Viscometer Y900 (Viscotek Corporation, Houston, Tex.) for the polyester dissolved in 50/50 weight % trifluoroacetic acid/methylene chloride at a 0.4 grams/dL concentration at 19° C. following an automated method based on ASTM D 5225-92. These measured IV values were correlated to IV values measured manually in 60/40 weight % phenol/1,1,2,2-tetrachloroethane following ASTM D 4603-96.

Dyeing Tests

Tectilon Acid Dyes in the Presence of Carrier

The as-spun yarn was knitted into a sock sample. A 5 gram sock sample was put into a scouring solution containing 2 weight % Merpol-HCS nonionic surfactant (DuPont) and 1 weight % acetic acid at 72° C. for 20 minutes. The sample was rinsed and placed into a 100 ml dye-bath containing 1 weight % of either Tectilon yellow 2G, Tectilon red 2B or Tectilon blue 4R and 0.5% Tanalon HIW carrier (Sybron Chemicals, Birmingham, N.J.) at pH 3. The dye bath was heated to 100° C. for 90 minutes. The sample was then rinsed with water and treated with 4% Erional PA solution (Ciba Corporation, Greensboro, N.C.) at pH 4.5–5.0 at 82° C. for 20 minutes for dye fixing. The remaining dye solution was measured in a visible spectrometer to calculate the exhaust.

Tectilon acid dyes were also run without a carrier in an identical manner to that above.

Lanaset Acid Dyes in the Absence of Carrier

The as-spun yarn was knitted into sock sample. A 5 gram sock sample was put into a scouring solution containing 2% Merpol-HCS and 1% acetic acid at 72° C. for 20 minutes. The sample was rinsed and placed into a 100 ml dye-bath containing 2% of either Lanaset Yellow 2R, Lanaset Red 2B, or Lanaset Blue 2R at pH 3. The dye bath was heated to 100° C. for 90 minutes. The sample was then rinsed with water and treated with 4% Erional PA solution at pH 4.5–5.0 at 82° C. for 20 minutes for dye fixing. The remaining dye solution was measured in a visible spectrometer to calculate the exhaust.

Tensile Testing of Fiber Yarns

Tensile testing was carried out at 70° F. (21° C.), relative humidity 65%, on an Instron type tensile tester. Yarn samples were twisted 3 turns per inch and were tested at a crosshead speed of 3.6 inches/minute at a gauge length of 6 inches. Five samples were run for each item tested.

Example 1

Poly(6,6'-imino-bishexamethylene terephthalamide) (PBHMT) was prepared in a three-necked flask fitted with a mechanical stirrer, a thermocouple and an air condenser. One mole (194.19 g) of dimethyl terephthalate (m.p. 140–142° C.) was combined with 1.02 moles (220 g) of bis(hexamethylene) triamine (BHMT) (which had been purified by distillation from High Purity Grade (95 weight %) BHMT to a colorless product (m.p. 33–36° C., b.p. 163–165° C./4 mm)) and 1.8 moles (32.4 g) of water. The mixture was slowly heated to 210–230° C. in 40 minutes while removing methanol by-product. The reaction was then continued at temperature under a 0.2–0.5 mm Hg vacuum for about one hour. The mixture was cooled and a glass-like product obtained which was broken up and ground in a Willey mill through a ⅛" (inch) mesh screen.

Polytrimethylene terephthalate (PTT) was prepared in a large-scale, batch two-vessel process. Molten dimethyl-terephthalate was added to 1,3-propanediol and tetraisopropyl titanate catalyst (Tyzor TPT, DuPont) in a transesterification vessel and the temperature was increased to 210° C. while methanol was removed. The resulting intermediate was transferred to a polycondensation vessel where the pressure was reduced to one millibar (10.2 Kg/cm2) and the temperature was increased to 250° C. When the desired melt viscosity was reached, the pressure was increased and the polymer was extruded, cooled and cut into pellets. The pellets were solid-phase polymerized to an intrinsic viscosity of 1.3 in a tumble dryer operated at 212° C.

Ground PBHMT was blended and reacted with PTT in a twin-screw spinning unit prior to spinning. Enough PBHMT (230 g) was blended and reacted with twenty pounds (9080 g) of PTT to form a copolymer containing 1.5 mole % BHMT. After dry mixing and blending the polymers at room temperature for 3–5 minutes, the molten copolymer was spun at 255° C. through a 34 hole spinneret with 10 mil diameter holes at 500 meters/minute, followed by drawing 3× at 1500 meters/minute at 60° C.–90° C.

A control yarn of the PTT used in this Example 1 and applicable to Examples 2 and 3 was also spun on the twin-screw spinning unit at 255° C. through a 34 hole spinneret with 10 mil diameter holes at 500 meters/minute, followed by drawing 3× at 1500 meters/minute at 60° C.–90° C.

The PTT fiber modified with 1.5 mole % BHMT was acid dyeable as shown by the results of dye exhaust testing in Table 1. The control PTT yarn was not acid dyeable. Tensile properties are given in Table 2.

Example 2

Polytrimethylene terephthalate modified with 3.0 mole % BHMT was prepared in a manner similar to Example 1 except that 459 g of PBHMT was melt blended and reacted with twenty pounds (9080 g) of PTT prior to spinning. This copolymer fiber was more deeply dyed than the fiber of Example 1. Table 1 shows the dye results and Table 2 shows the tensile properties.

Example 3

Polytrimethylene terephthalate modified with 4.5 mole % BHMT was prepared in a manner similar to Example 1 except that 690 g of PBHMT was melt blended and reacted with twenty pounds (9080 g) of PTT prior to spinning. This copolymer fiber was more deeply dyed than the fiber of Example 1. Table 1 shows the dye results and Table 2 shows the tensile properties.

In the Tables below, mole % BHMT is equivalent to the mole % of secondary aliphatic amine unit.

TABLE 1

DYE EXHAUST vs. BHMT LEVEL

| Example | BHMT (mole %) | % Lanaset Dye Exhaust | | | % Tectilon Dye Exhaust Without Carrier | | | % Tectilon Dye Exhaust With Carrier | | |
|---|---|---|---|---|---|---|---|---|---|---|
| | | Yellow 2R | Red 2B | Blue 2R | Yellow 2G | Red 2B | Blue 4R | Yellow 2G | Red 2B | Blue 4R |
| Control | — | 4.8 | 0 | 0 | 0 | 0 | 1.5 | 0 | 0 | 1.5 |
| 1 | 1.5 | 77.7 | 34.6 | 11.2 | 16.0 | 19.0 | 13.4 | 20.2 | 24.9 | 23.9 |
| 2 | 3.0 | 83.1 | 43.7 | 16.7 | 26.4 | 20.3 | 21.9 | 29.9 | 35.6 | 31.1 |
| 3 | 4.5 | 86.1 | 56.8 | 31.7 | 70.3 | 47.7 | 53.1 | 85.4 | 71.6 | 55.4 |

TABLE 2

YARN PHYSICAL PROPERTIES vs. BHMT LEVEL

| Example | BHMT (Mole %) | Yarn IV | Tenacity (g/d) | Modulus (g/d) | Elongation (%) |
|---|---|---|---|---|---|
| Control | 0 | 0.82 | 2.6 | 23 | 64 |
| 1 | 1.5 | 0.80 | 2.3 | 23 | 62 |
| 2 | 3.0 | 0.70 | 1.8 | 23 | 66 |
| 3 | 4.5 | 0.64 | 1.7 | 19 | 62 |

Examples 4–6

Another series of PTT/PBHMT fibers were prepared as Example 1, but with 1, 2 and 3 mole % BHMT. This series was acid-dyeable as expected. However, just as in Examples 1 to 3 (and shown in Table 2), intrinsic viscosity and tenacity apparently decreased with increased amounts of PBHMT, as shown in Table 3.

Another control yarn was spun in the same manner as that for Example 1–3 and is applicable to Examples 4–6. It was not acid-dyeable.

TABLE 3

YARN PHYSICAL PROPERTIES vs. BHMT LEVEL

| Example | BHMT Mole % | Yarn IV | Tenacity g/d | Modulus g/d | Elong. % | Denier |
|---|---|---|---|---|---|---|
| Control | — | 0.92 | 2.4 | 23 | 70 | 200 |
| 4 | 1.0 | 0.91 | 2.4 | 25 | 61 | 195 |
| 5 | 2.0 | 0.77 | 1.9 | 23 | 75 | 197 |
| 6 | 3.0 | 0.73 | 1.5 | 25 | 69 | 173 |

Examples 7 and 8

Intrinsic viscosity and tenacity were improved by adding small amounts of hexamethylene diamine (HMD) with the bis(hexamethylene) triamine (BHMT) to make a copolymer when reacted with dimethyl terephthalate (DMT). This copolymer poly(6,6'-imino-bishexamethylene terephthalamide-co-hexamethylene terephthalamide) (PBHMT/PHMT) was prepared in a manner similar to Example 1.

For Example 7, 242.7 g (1.25 moles) of dimethyl terephthalate (DMT) was mixed with 255.8 g (1.188 moles) bishexamethylene triamine (BHMT) and 11.53 g (0.069 moles, 10% excess) of a 69.3% aqueous hexamethylene diamine (HMD) solution and 40.5 g (2.25 moles) of water. The mixture was gradually heated to 212° C. in 30 minutes at atmospheric pressure while removing methanol by-product. The pressure was reduced to 1.5 mm Hg and the reaction continued for 10 more minutes. The reaction product was cooled and a glasslike polymer obtained, which was broken up and ground in a Willey mill through a ⅛" mesh screen. The ground PBHMT/PHMT copolymer (DMT/BHMT/HMD)(1.0/0.95/0.05 mole ratio) was blended and reacted with PTT in a twin-screw spinning unit prior to spinning. Enough PBHMT/PHMT copolymer (39.9 g) was added to 2270 g of PTT to form a copolymer containing 1.0 mole % of DMT/BHMT/HMD (1.0/0.95/0.05 mole ratio). Spinning was performed as in Example 1.

For Example 8, 42.7 g (0.225 moles) of dimethyl terephthalate (DMT) was mixed with 42.7 g (0.197 moles) bishexamethylenetriamine (BHMT) and 4.8 g (0.031 moles, 10% excess) of a 75% aqueous hexamethylene diamine (HMD) solution and 7.3 g (0.405 moles) of water. The mixture was gradually heated to 228° C. in 34 minutes at atmospheric pressure while removing methanol by-product. The pressure was reduced to 0.15 mm Hg and the reaction continued for 28 more minutes. The reaction product was cooled and a glasslike polymer obtained. The ground PBHMT/PHMT copolymer (DMT/BHMT/HMD) (1.0/0.875/0.125 mole ratio) was blended and reacted with PTT in a twin-screw spinning unit prior to spinning. Enough PBHMT/PHMT copolymer (42.8 g) was added to 2270 g of PTT to form a copolymer containing 1.0 mole % of DMT/BHMT/HMD (1.0/0.875/0.125 mole ratio). Spinning was performed as in Example 1.

After spinning, the fibers of Examples 7 and 8 appeared to be at least as acid-dyeable as PBHMT modified fiber at the same level of modification. Intrinsic viscosity and tenacity were improved (Table 4) over the samples with PBHMT alone (Table 3).

The control yarn was the same as used in Examples 4–6. It was not acid-dyeable.

TABLE 4

YARN PHYSICAL PROPERTIES vs. BHMT LEVEL

| Example | DMT/BHMT/HMD In Polymeric Additive - Mole Ratio | BHMT/HMT Mole % (in 3GT Composition) | Yarn IV | Tenacity g/d | Modulus g/d | Elong. % | Denier |
|---|---|---|---|---|---|---|---|
| Control | None | | 0.92 | 2.4 | 23 | 70 | 200 |
| 7 | 1/0.95/0.05 | 1.0 | 0.96 | 2.6 | 24 | 51 | 200 |
| 8 | 1/0.875/0.125 | 1.0 | 0.98 | 2.8 | 25 | 53 | 198 |

Example 9

A bicomponent fiber was prepared as follows: 342 g. PBHMT/PHMT polymer and 20 lb. of polytrimethylene terephthalate polymer (prepared as in Example 8 –1.3 IV polytrimethylene terephthalate with 0.75 BHMT/0.25 HMD additive, having 2 mole % BHMT) were tumble mixed and compounded in a twin screw extruder at 230° C. The resulting pellets were dried at 120° C. for 16 hours, and poured into a hopper, and extruded through a bicomponent spinneret into fiber at 255–265° C. In the same time, polyethylene terephthalate pellets (Crystar® 4415, DuPont) were added into another hopper, extruded at 275–285° C. into the same spinneret forming a bicomponent fiber with equal amounts of polyethylene terephthalate and polytrimethylene terephthalate, only the latter containing PBHMT/PHMT acid dye modifier. The polymers were melt spun through a 68 hole spinneret to form 34 side-by-side snowman cross-section bicomponent filaments (50/50 v/v) just below the spinneret face. (An example of such a cross-section is illustrated in FIG. 4 of U.S. Pat. No. 3,671,379.) The spinneret was maintained at 275° C. The filaments were spun past a quench zone 66 inches long through ambient temperature cross-flow air moving at 0.14 ft.sec, past a finish tip to lubricate the yarn, and onto a 60° C. feed roll with a surface speed of 842 meters/minute. This yarn was then drawn 3.8× with a 90° C. draw roll with a surface speed of 3200 meters/minute, and then onto a 160° C. heat-treating roll operating at 3200 meters/minute, over a 3200 meters/minute quench roll operating at ambient, and onto a windup. The yarn had 34 filaments, and upon hot relaxation, it spontaneously displayed helical crimp. The physical properties of the resulting bicomponent yarn are shown in Table 5.

Crimp contraction levels were measured immediately after drawing and heat-treating by hanging a loop of fiber from a holder with a 1.5 mg/denier (1.35 mg/dtex) weight attached to the bottom of the loop and measuring the length of the loop. Then a 100 mg/den (90 mg/dtex) weight was attached to the bottom of the loop, and the length of the loop was measured again. Crimp contraction was calculated as the difference between the two lengths, divided by the length measured with the 90 mg/dtex weight.

In this example, the tensile property was tested by twisting three turns per inch, running at 3 inch/minute crosshead speed and 5 inch gauge length.

The control was a bicomponent fiber made as above, except that it did not contain polymeric additive.

Examples 10A and 10B

A PBHMT/PHMT polymer salinized with phosphorous acid ($H_3PO_3$) was prepared as follows:

A 2 liter three-neck flask, equipped with a mechanical stirrer, a thermal couple and an air condenser, was charged with 310.4 g (1.6 moles) dimethyl terephthalate (DMT), 258.5 g (1.2 moles) bis(hexamethylene) triamine (BHMT), and 60.4 g (0.33 mole) of 69.7% hexamethylenediamine (HMD) solution, and 98.4 g $H_3PO_3$ (1.2 moles) in 50 g (2.78 moles) water. The mixture was heated slowly to 210–230° C. for 40–60 minutes while methanol was distilled. The reaction was then continued under vacuum at about 0.2–0.5 mm Hg for about 1 hour. The glass-like polymer product was then collected and ground after cooling down to room temperature.

The resultant polymer was compounded with PTT pellets at 220° C. at 2 and 4 BHMT mole % levels (Examples 10A and 10B, respectively), and spun into fiber at 260° C. The physical properties of the resulting yarn are shown in Table 6 below. Dye exhaust tests are shown in Table 8.

Example 11

A polymer was prepared according to the procedure in Example 10, except that the monomer (mole) ratio was DMT/BHMT/HMD/$H_3PO_3$=1/0.8/0.2/0.8. Yarn physical properties are shown in Table 6. The yarns were knitted into socks and dyed at 100° C. by Lanaset dyes as shown in Table 7.

Example 12

A PBHMT/PHMT polymer salinized with phosphoric acid ($H_3PO_4$) was prepared as follows:

A 2 liter three-neck flask, equipped with a mechanical stirrer, a thermal couple and an air condenser, was charged with 310.4 g (1.6 moles) dimethyl terephthalate (DMT), 275.7 g.(1.28 moles) bis(hexamethylene) triamine (BHMT), and 55 g. (0.33 mole) of 69.7% hexamethylenediamine (HMD) solution, and 147.6 g. 85% $H_3PO_4$ (1.28 moles), and 43.2 g. (2.4 moles) water. The mixture was heated slowly to 210–230° C. for 40–60 minutes while methanol was distilled. The reaction was then continued under vacuum at about 0.2–0.5 mm Hg for about 1 hr. The glass-like polymer product was then collected and ground after cooling down to room temperature.

TABLE 5

Physical Properties of 3GT/2GT Bicomponent Yarns

| Example | Polymeric Additive Mole Ratio DMT/BHMT/HMD | BHMT Mole % | Tenacity g/d | Modulus g/d | Elong. % | Crimp % | Denier |
|---|---|---|---|---|---|---|---|
| Control | None | — | 3.64 | NA | 18.74 | 66 | 73.6 |
| 9 | 1.0/0.75/0.25 | 2.0 | 2.55 | 23.19 | 13.20 | 17 | 72.6 |
| 9 (repeat) | 1.0/0.75/0.25 | 2.0 | 2.77 | 23.74 | 15.49 | 21 | 72.9 |

The tenacity of the bicomponent yarn containing the additive was decreased compared to the Control sample, but the overall physical properties shown are within an acceptable range for many applications requiring a dyeable bicomponent fiber.

The yarn was knitted into socks and dyed with acid dyes into light gray and beige color. The color looked solid even though the polyethylene terephthalate part was not modified for acid dyeability.

The polymer was mixed with PTT pellets and spun into fiber at 260° C. Physical properties of the resulting fibers are shown in Table 6. The yarns were knitted into socks and dyed at 100° C. by Lanaset dyes as shown in Table 8. Dye exhaust tests are shown in Table 8.

Controls 1 and 2 were prepared with the same 3GT (without polymeric additive).

TABLE 6

YARN PHYSICAL PROPERTIES vs. ADDITIVE LEVEL

| Example | Additive Mole Ratio DMT/BHMT/HMD/ $H_3PO_3$ or $H_3PO_4$ | BHMT Mole % | Fiber IV | Tenacity g/d | Modulus g/d | Elongation % | Denier |
|---|---|---|---|---|---|---|---|
| Control #1 | None | — | 0.927 | 3.01 | 26.13 | 45.92 | 97.2 |
| 10A | 1.0/0.75/0.25/0.75 ($H_3PO_3$) | 2.0 | 0.840 | 2.44 | 25.64 | 46.88 | 97.6 |
| 10B | 1.0/0.75/0.25/0.75 ($H_3PO_3$) | 4.0 | 0.774 | 2.32 | 23.84 | 49.72 | 93.2 |
| Control #2 | — | — | 0.892 | 2.60 | 23.42 | 70.62 | 94.9 |
| 11 | 1/0.80/0.20/0.80 ($H_3PO_3$) | 2.0 | 0.797 | 2.38 | 23.04 | 61.84 | 97.7 |
| 12 | 1.0/1.0/0/100 ($H_3PO_4$) | 2.0 | 0.854 | 2.37 | 24.06 | 69.29 | 183.9 |

The addition of phosphorous acid or phosphoric acid reduced the IV loss during spinning. At 2 mole %, the yarn IV can be maintained at 0.84 in the presence of phosphorous acid (Example 10A), or 0.85 in the presence of phosphoric acid (Example 12), while the IV can only be kept at 0.77 in the absence of either acid (Example 5). As a result, the fiber properties are improved too as shown in the above table. The physical properties of the fiber were decreased with increased amounts of the additive, as expected, but are close to the Control and are considered good, with tenacities well above 2.0 g/d.

The yarns were knitted into socks and dyed at 100° C. by Lanaset dyes as shown in Table 8.

Color was measured using a Varian Cary 5 uv/vis/nir spectrophotometer with 110 mm integrating sphere (Varian, Inc., Palo Alto, Calif.). This method involved collecting a baseline for 100% and 0% reflectance using PTFE reference disk, and then replacing the reference disk with the sample. Diffuse reflectance uv/vis spectrum is collected. The spectral data, xy pairs, are processed using Varian Color Calculation software version 5.1.

In the following table, the L is a measurement of degree of whiteness, 100 means black, 0 means white; b is a measurement of red and green; a is a measurement of blue and yellow; Read "L","a", "b" means the numbers from the instrument reading;

L calc, a calc, and b calc are calculated numbers from the read numbers; and WI and YI are white index and yellow index calculated from the L, a, b numbers by the defined equations.

TABLE 7

COLOR READINGS OF SOCK SAMPLES vs. $H_3PO_3/H_3PO_4$ LEVEL

| Example | $H_3PO_3$ $H_3PO_4$ | Read "L" | Read "a" | Read "b" | L calc. | A Calc. | b calc. | WI | YI |
|---|---|---|---|---|---|---|---|---|---|
| 5 | None | 89.99 | −2.61 | 11.65 | 91.5 | −2.0 | 4.7 | 59.4 | 7.6 |
| 11 | 0.8 $H_3PO_3$ equ. To BHMT | 88.94 | −0.68 | 4.54 | 90.5 | −0.5 | 1.8 | 72.4 | 3.2 |
| 12 | 0.8 $H_3PO_4$ equ. To BHMT | 88.24 | −0.60 | 3.46 | 90.71 | 0.6 | 3.5 | 60.8 | 5.5 |

The above 3 samples all contain 2 mole % BHMT polymer but with different compositions. Phosphorous acid improves fiber color, as shown in the above table. The white index (WI) increased significantly and the yellow index (YI) decreased. Phosphoric acid also imparts some improvement, but less than phosphorous acid.

TABLE 8

DYE EXHAUST vs. BHMT/$H_3PO_3$ or $H_3PO_4$ LEVEL

| | Additive Mole Ratio DMT/BHMT/HMD/ | BHMT | % Lanaset Dye Exhaust | | |
|---|---|---|---|---|---|
| Example | $H_3PO_3$ or $H_3PO_4$ | mole % | Yellow 2R | Red 2B | Blue 2R |
| 10A | 1.0/0.75/0.25/0.75 | 2.0 | 82.1 | 42.4 | 22.7 |
| 10B | 1.0/0.75/0.25/0.75 | 4.0 | 89.3 | 54.2 | 30.5 |
| 12 | 1.0/1.0/0.0/0.8 | 2.0 | 80.7 | 40.6 | 19.4 |

The above examples show that the % dye exhaust improves with an increased amount of the phosphorous acid additive (Example 10B vs. Example 10A). The % dye exhaust is slightly lower with the phosphoric acid additive than with phosphorous acid (Example 12 vs. Example 10A), but still good.

Example 13

Polymeric additive was made using terephthalic acid (TPA) as follows by charging a 35 pound autoclave with:

3,277.7 grams (19.73 moles) TPA 1,294.0 grams (15.78 moles) phosphorous acid 3,398.9 grams (15.78 moles) BHMT 459.0 grams (3.95 moles) HMD 14,528 grams water The mixture was stirred at 15 RPM and heated up to 230° C. and 250 psi. Then the pressure was reduced to atmosphere within 1 hour, while holding the temperature at 230° C. The polymer melt was discharged into a drum containing dry ice under venting. After cooling, the polymer was dried at room temperature overnight and ground into flakes. This polymeric additive was suitable for acid dyeing polyester.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A polymeric additive for incorporating secondary amine units into the polymer chain of a polyester composition comprising a compound having the following formula:

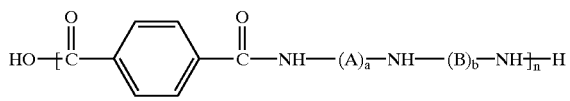

wherein A or B, which may be the same or different, are select from aliphatic or aromatic substituents, wherein n is 10–30, a is 3–20 and b is 3–20, wherein the polymer composition comprises about 0.5 mol % to about 15 mol % secondary amine units.

2. The polymeric additive of claim 1 wherein n is 10–20.

3. The polymeric additive of claim 2 wherein A or B, which may be the same or different, are selected from alkyl and aryl and each may contain 0–20 alkyl units and 0–3 aryl units, provided that each contains at least one aryl unit or at least two alkyl units.

4. The polymeric additive of claim 1 wherein n is 15.

5. The polymeric additive of claim 1 wherein a is 5–20.
6. The polymeric additive of claim 1 wherein a is 5–12.
7. The polymeric additive of claim 1 wherein b is 5–20.
8. The polymeric additive of claim 1 wherein b is 5–12.
9. The polymeric additive of claim 1 wherein a is 5–20 and b is 5–20.

10. The polymeric additive of claim 9 wherein A or B, which may be the same or different, are selected from alkyl and amyl and each may contain 0–20 alkyl units and 0–3 aryl units, provided that each contains at least one aryl unit or at least two alkyl units.

11. The polymeric additive of claim 1 wherein a is 5–12 and b is 5–12.

12. The polymeric additive of claim 11 wherein A or B, which may be the same or different, are selected from alkyl and aryl and each may contain 0–20 alkyl units and 0–3 aryl units, provided that each contains at least one aryl unit or at least two alkyl units.

13. The polymeric additive of claim 1 wherein n is 10–20, a is 5–20 and b is 5–20.

14. The polymeric additive of claim 13 wherein A or B, which may be the same or different, are selected from alkyl and aryl and each may contain 0–20 alkyl units and 0–3 aryl units, provided that each contains at least one aryl unit or at least two alkyl units.

15. The polymeric additive of claim 1 wherein n is 10–20, a is 5–12 and b is 5–12.

16. The polymeric additive of claim 15 wherein A or B, which may be the same or different, are selected from alkyl and aryl and each may contain 0–20 alkyl units and 0–3 aryl units, provided that each contains at least one aryl unit or at least two alkyl units.

17. The polymeric additive of claim 1 wherein A or B, which may be the same or different, are selected from alkyl and aryl and each may contain 0–20 alkyl units and 0–3 aryl units, provided that each contains at least one aryl unit or at least two alkyl units.

18. The polymeric additive of claim 1 further comprising a compound formed from hexamethylene diamine and bis (hexamethylene triamine) and a diacid, wherein the ratio of hexamethylene diamine and bis(hexamethylene triamine) to the diacid is about 1:1.

19. The polymeric additive of claim 1, wherein the polymeric composition comprises about 0.5 mol % to about 10 mol % secondary amine units.

20. The polymeric additive of claim 19, wherein the polymeric composition comprises about 1 mol % to about 10 mol % secondary amine units.

21. The polymeric additive of claim 20, wherein the polymeric composition comprises about 2 mol % to about 5 mol % secondary amine units.

22. A polymeric additive for incorporating secondary amine units into the polymer chain of a polyester composition comprising poly(6,6'-imino-bishexamethylene terephthalamide) having repeat units according to the formula:

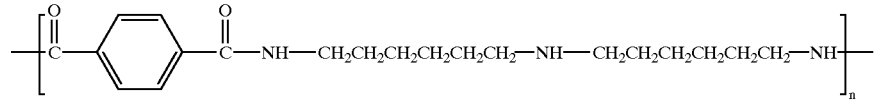

wherein n is 10–30, wherein the polymeric composition comprises about 0.5 mol % to about 15 mol % secondary amine units.

23. Poly(6,6'-imino-bishexamethylene terephthalamide) as claimed in claim 22 wherein n is 10–20.

24. Poly(6,6'-imino-bishexamethylene terephthalamide) as claimed in claim 22 wherein n is 15.

25. A polymeric additive for use in forming an acid-dyeable polyester composition, said polymeric additive prepared from a triamine containing one or more secondary amine salt units and one or more other units selected from monomer units, polymer units and salts thereof, said polymeric additive comprising secondary amine units in a ratio of about 1.005:1 to about 1.15:1 to other monomer units, wherein the amount of secondary amine units is effective to promote acid-dyeability of said polyester composition.

26. The polymeric additive of claim 25 wherein said other monomer units are terephthalate units or naphthalene dicarboxylate units.

27. The polymeric additive of claim 25, comprising about a 1 mole % to about a 10 mole % excess of said triamine such that said polymeric additive is end capped with primary amine units.

* * * * *